(12) United States Patent
Kongot

(10) Patent No.: US 10,636,001 B2
(45) Date of Patent: Apr. 28, 2020

(54) PROJECT STRUCTURE MAPPER

(71) Applicant: SAP SE, Walldorf (DE)

(72) Inventor: Aparna Kongot, Bangalore (IN)

(73) Assignee: SAP SE, Walldorf (DE)

( * ) Notice: Subject to any disclaimer, the term of this patent is extended or adjusted under 35 U.S.C. 154(b) by 844 days.

(21) Appl. No.: 14/534,221

(22) Filed: Nov. 6, 2014

(65) Prior Publication Data

US 2016/0132817 A1    May 12, 2016

(51) Int. Cl.
*G06Q 10/06*    (2012.01)

(52) U.S. Cl.
CPC ... *G06Q 10/063114* (2013.01); *G06Q 10/067* (2013.01); *G06Q 10/0637* (2013.01)

(58) Field of Classification Search
CPC ......... G06Q 10/063114; G06Q 10/067; G06Q 10/0637
USPC ....................................................... 705/7.15
See application file for complete search history.

(56) References Cited

U.S. PATENT DOCUMENTS

| | | | | |
|---|---|---|---|---|
| 2003/0137541 A1* | 7/2003 | Massengale | ......... | G06F 3/0481 715/764 |
| 2006/0041447 A1* | 2/2006 | Vucina | ................... | G06Q 10/06 705/7.21 |
| 2010/0125814 A1* | 5/2010 | Lemons | ........... | G06Q 10/06316 715/853 |
| 2010/0305987 A1* | 12/2010 | Correll | ................... | G06Q 10/06 705/7.28 |
| 2012/0130907 A1* | 5/2012 | Thompson | ........... | G06Q 10/103 705/301 |
| 2015/0145854 A1* | 5/2015 | Deshpande | ........... | G06T 11/206 345/418 |

OTHER PUBLICATIONS

Tool melds EIS, project management. Ferranti, Marc. PC Week10. n5: p33(2). Ziff Davis Enterprise. (Feb. 8, 1993).*
GenSight Group; GenSight Advances Project Portfolio Management with Custom Interactive Charting. Anonymous. Information Technology Newsweekly [Atlanta] Mar. 10, 2009: 211.*

* cited by examiner

*Primary Examiner* — Timothy Padot
(74) *Attorney, Agent, or Firm* — Fish & Richardson P.C.

(57) ABSTRACT

Various embodiments of systems and methods to provide a project structure map are described herein. In one aspect, a description of a project defining activities of the project is received. Insights associated with the activities are determined based on the received description and are displayed in a focus of a first circular disc on a GUI. A predefined number of nodes representing a first level of activities of the activities are displayed on the first circular disc. Upon receiving a selection of a node on the first circular disc, a predefined number of nodes representing a second level of activities associated with a first level of activity corresponding to the selected node are displayed on a second circular disc concentric to the first circular disc. Insights of the first level of activity corresponding to the selected node are displayed in the focus of the first circular disc.

18 Claims, 9 Drawing Sheets

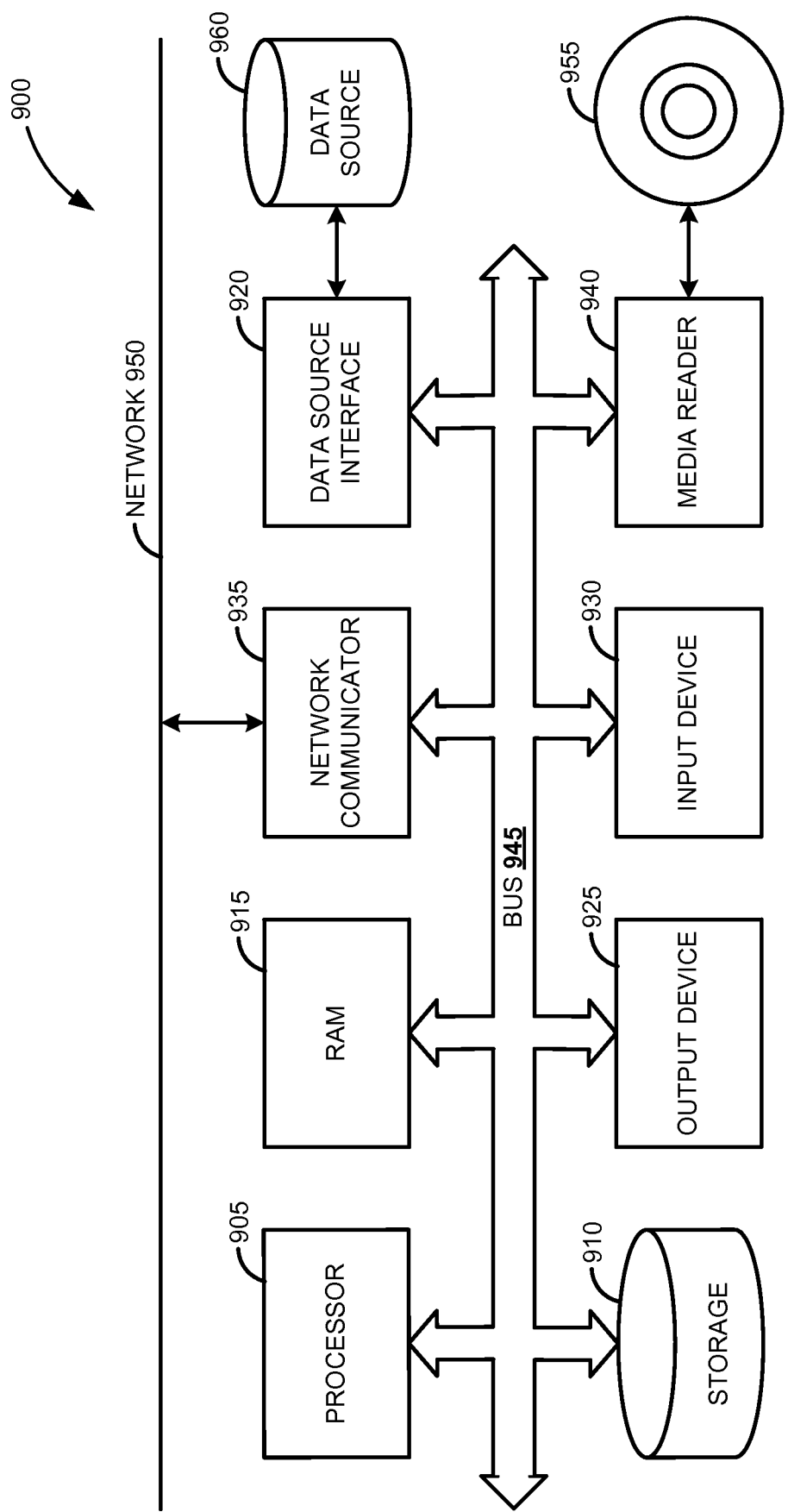

PROJECT STRUCTURE MAPPER

BACKGROUND

Project management applications provide functions for planning, scheduling, resource allocation, budget control, and other aspects of managing projects. These applications may provide a collaborative environment in which users can view and interact with information related to the project. For example, activities of the project can be represented in ways such as tree hierarchy structure diagrams, Gantt charts, program evaluation and review technique (PERT) diagrams and so on for analyzing the activities.

In order to plan and manage a large project, it may be important to understand finer details of project's structure in depth, including important activities, on-going activities, its dependencies on other activities and the like. In the tree hierarchy structure diagrams, nodes are used to graphically represent activities in the project and first level activities are always displayed. When an activity in the first level is selected, sub-activities within the selected activity are displayed. Given the volume of nodes at each level, selecting a level for viewing may lead to a visual clutter of information. Also, in the course of the project, the focus may be on an activity or a sub-activity ongoing at that point in time or in certain cases, few succeeding and preceding activities and/or critical activities. In a tree structure representation, it may require additional effort and time to scan through the large data and locate such information. Also, using techniques such as Gantt charts and PERT network diagrams, only limited values may be scaled.

Further, users of project management applications may either painstakingly tape together printed, mural-sized charts on a weekly basis or rely primarily on spreadsheets. These techniques can be error-prone, and may be difficult to recognize finer details of the project structure. Therefore, it can be difficult to visualize large projects having big or huge data and analyze insight associated with an activity, which has to be surfaced and brought to the immediate attention of a project manager.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 9 is a block diagram of an exemplary computer system, according to an embodiment.

DETAILED DESCRIPTION

Embodiments of techniques to provide project structure mapper are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
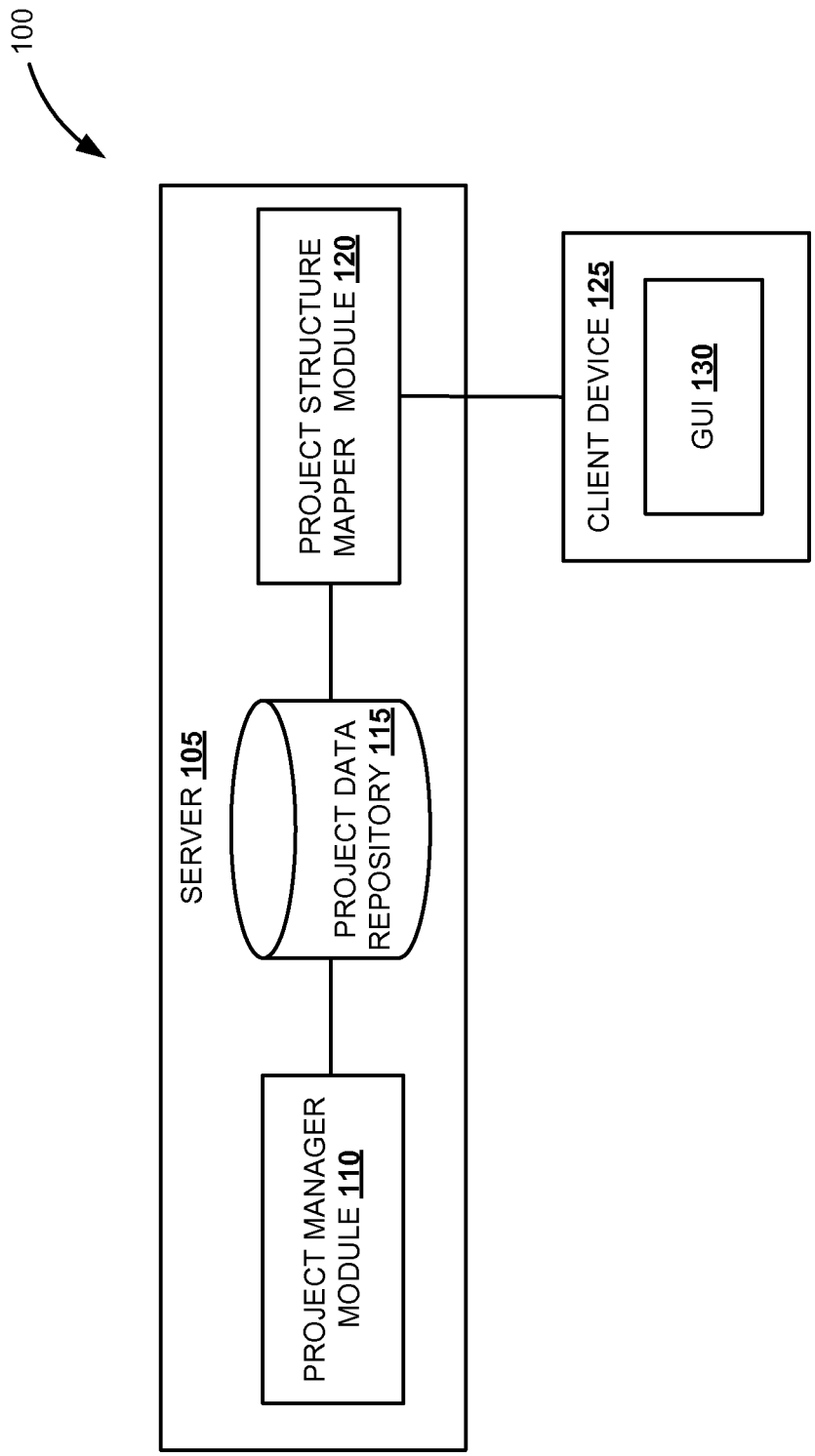
FIG. 1 is a block diagram illustrating, at a high-level, functional components of a system for implementing a project structure mapper module, according to an embodiment.

FIG. 1 is a block diagram illustrating, at a high-level, functional components of system 100 for implementing project structure mapper module 120 according to an embodiment. The system 100 includes server 105 or other system executing project manager module 110 or an application. The project manager module 110 can include different applications for defining, managing, and accessing project data repository 115 defining a number of activities and associated sub-activities of a project.

According to one embodiment, the server 105 can include the project structure mapper module 120 having access to the project data repositoryl 15. It should be noted that, while the project structure mapper module 120 is illustrated here as separate from the project manager module 110 for the sake of simplicity and clarity, the project structure mapper module 120 may, depending upon the exact implementation, be part of the project manager module 110 or application or another application or module of the server 105 or even another computer system. Additionally, it should be understood that the project structure mapper module 120 can be implemented on another device rather than on the server 105. For example, the project structure mapper module 120 can be implemented on client device 125 such as a personal computer, tablet, cell phone or other mobile device, that reads project activity descriptions of the project from the server 105 and then performs the various processes described below for generating and drawing or rendering a project structure map locally, on graphical user interface (GUI) 130 of the client device 125.

Further, regardless of where it is executing, the project structure mapper module 120 can execute an algorithm that can draw the project structure map for an arbitrarily complex group such as activities, sub-activities and insights of the project data associated with the project. The insights of the project provide finer details of project's structure in depth, including important activities, critical activities, on-going activities, and the like. In other words, the project structure map can be generated from a description of the project stored in the project data repository 115. According to one embodiment, an activity of the project can be represented in the description as an ID number or label derived from the activity's line number in its overall Work Breakdown Structure (WBS) and the activity's duration (For example: start date, end date, duration in days or months). Further, the sub-activities associated with the activities can further include the ID number(s) that activity is dependent on. If no other sub-activities are present, that activity can be considered an initial activity. The description may also include status of the activities, a predecessor activity and a successor activity associated with the activities.

In one embodiment, generating and providing a graphical, interactive map representing a project can begin with reading a description of the project. The description can define a plurality of activities in the project. Based on the description, first level of activities are represented using equidistant nodes and are displayed on a first circular disc. The insights of the project can be determined based on the description of the activities and rendered on a focus of the first circular disc. Further, based on a selection of a node on the first circular disc, second level of activities or sub-activities associated with an activity corresponding to the selected node are displayed on a second circular disc concentric to the first circular disc.

Further, a number of nodes to be displayed on the first circular disc and subsequent circular discs are predefined based on a screen capacity of the graphical user interface 130. In one embodiment, the order in which the activities are displayed on circular discs can be customized based on the insight of the project. Since the predefined number of nodes representing activities is displayed and the order in which the activities are displayed can be customized, visual clutter with irrelevant information that can hamper productivity can be eliminated.

Once the project structure map is generated by the project structure mapper module 120, the project structure map can be sent to client device 125. The client device 125 can include a wide variety of computing devices including, but not limited to a personal computer, tablet, cell phone and other mobile device. User can include an application adapted to receive and render the project structure map for viewing on the client device and for supporting interaction with the project structure map, e.g., scrolling, zooming, selecting, receiving inputs and the like.

Figure 2:
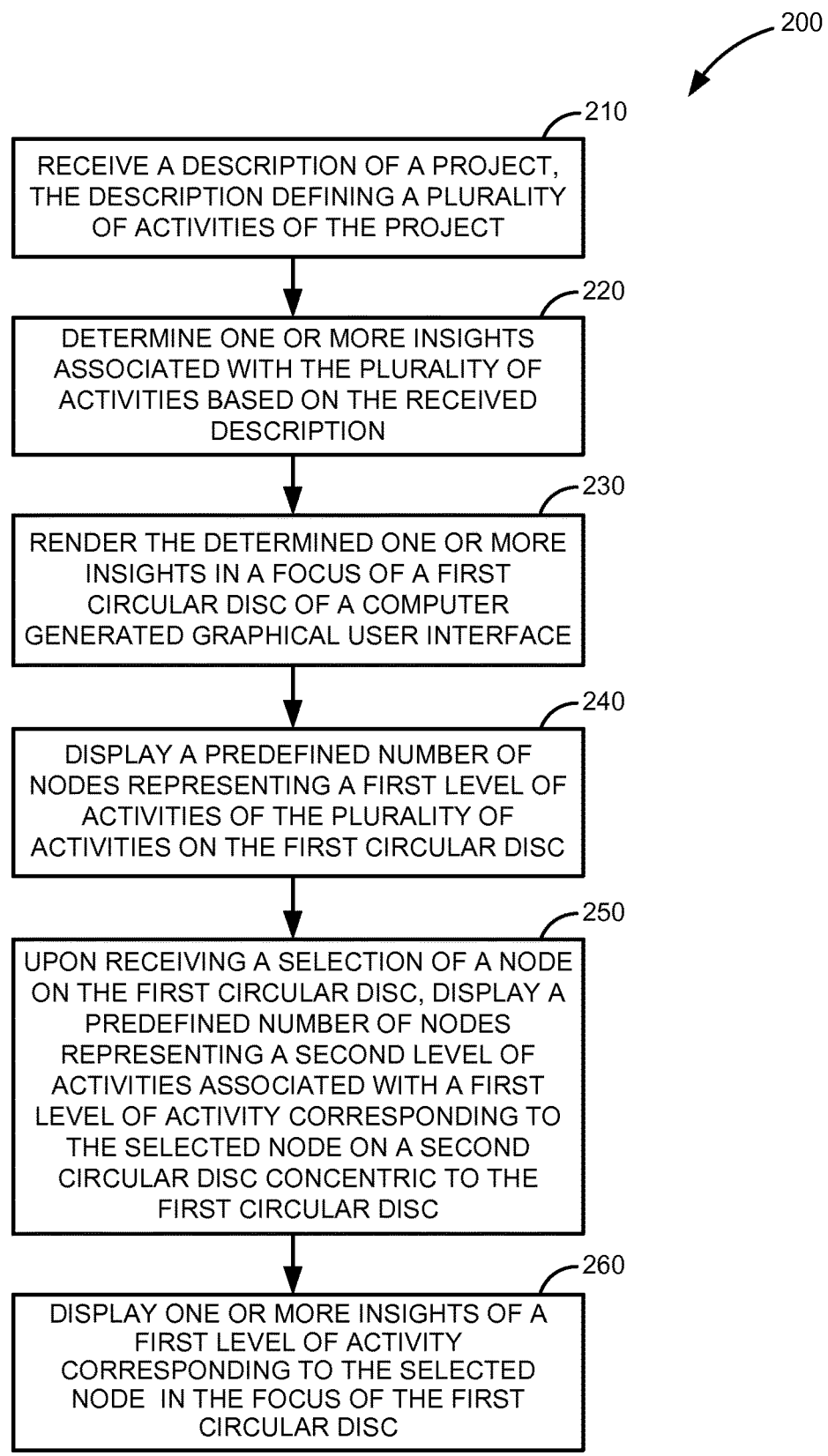
FIG. 2 is a flow diagram illustrating a process to generate a project structure map, according to an embodiment.

FIG. 2 is a flow diagram illustrating process 200 to generate a project structure map, according to an embodiment. At 210, generating and providing a graphical, interactive map (such as project structure map 300 of FIG. 3, for example) representing the project can begin with receiving a description of the project. The description defines a plurality of activities of the project. The description of the activities may include predefined attributes such as, but are not limited to ID numbers or labels of the activities, a number of sub-activities associated with the activities, duration of the activities such as a start date and end date of an activity, status of the activities, and a predecessor activity and a successor activity associated with the activities.

For example, the description of a project "project blossom- H-564-67" includes names and IDs of first level of activities "resource", "finance", "quality", "dealers", "logistics", "procurement", "design", "testing", "re-design", "development", "sales", "support", "bug fixes" and "correction close." Further, the description includes duration of the project "project blossom- H-564-67", Feb. 1, 2014 to Mar. 31, 2016, for instance. Also, duration of each activity associated with the project "project blossom- H-564-67." Further, the description includes status of each activity, whether the activity "quality" is "completed" or "yet to start" or "in progress", for instance. And, at least one of the predecessor activity and the successor activity associated with each activity, the activity "logistics" is the predecessor activity of the activity "procurement" and the activity "design" is the successor activity of the activity "procurement", for instance. Furthermore, the description includes second and subsequent level of activities associated with each activity of the first level of activities. The first level of activity "design" includes second level of activities "user research", "persona", "wireframe", "validate", "mockup", "feasibility check", "usability testing" and "final mockup". Also, the second level of activity "usability testing" includes third level of activity "user recruitment", "create scripts", "conduct test" and "consolidate", for instance.

At 220, one or more insights associated with the plurality of activities are determined based on the received description. The insights may include a predefined list of priority tasks associated with the project such as, but are not limited to a number of critical activities (e.g., missed deadline activities, activities which are not started as per schedule and the like), a number of important activities, a number of on-going activities and a number of recently completed activities, time periods such as the start times and end times of the project, i.e., represent the span of the project. In one embodiment, the priority tasks can be predefined based on the nature of the project. For example, in a particular project, if recently completed activities are not useful, the list of priority tasks is modified to exclude recently completed activities from the insights.

At 230, the determined insights of the project are rendered in a focus of a first circular disc of a computer generated graphical user interface (GUI).

Figure 3:
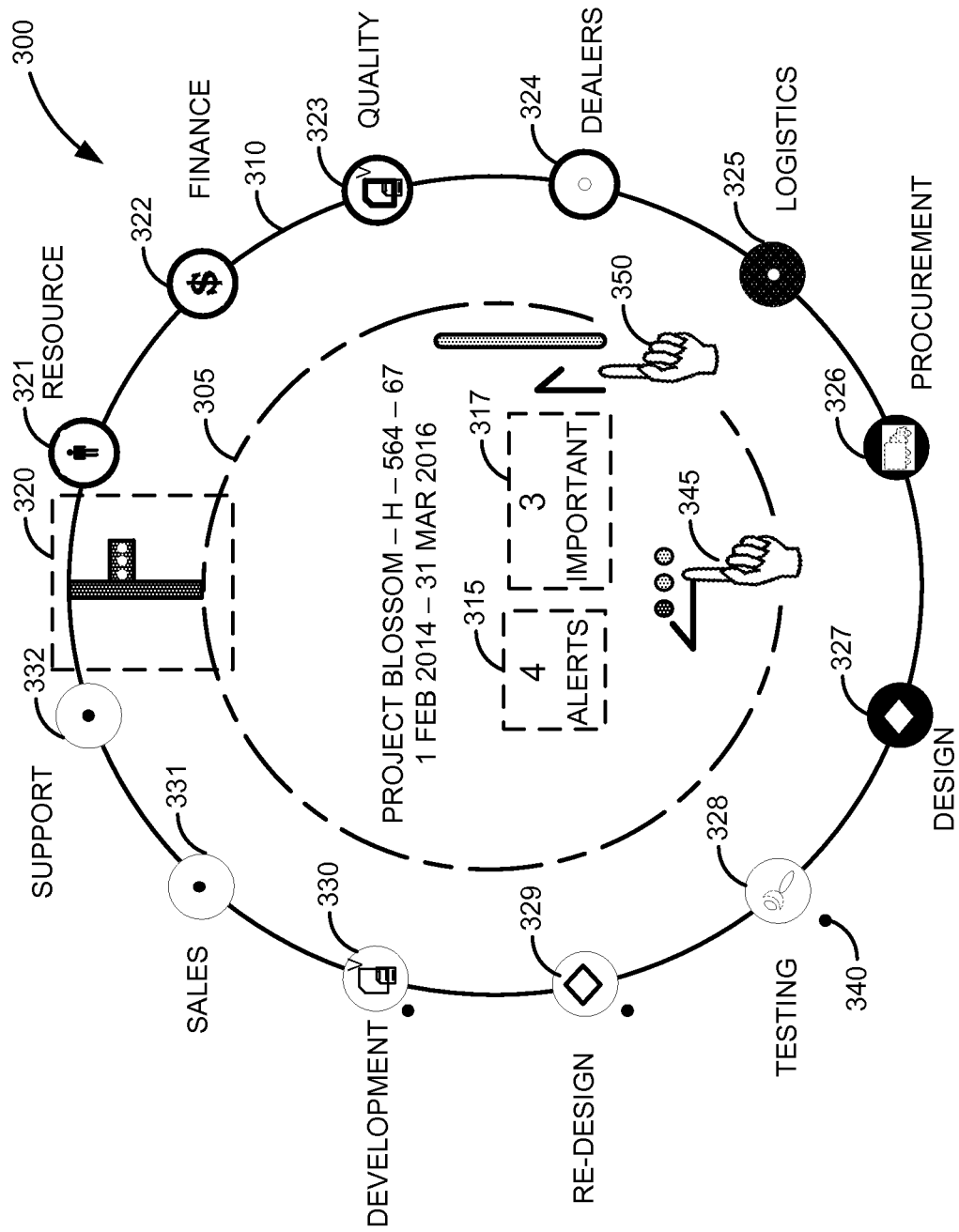
FIG. 3 shows a GUI illustrating an exemplary project structure map of a project "project blossom- H-564-67", according to an embodiment.

FIG. 3 shows a GUI illustrating exemplary project structure map 300 of the project "project blossom- H-564-67", according to an embodiment. The project structure map 300 includes a plurality of concentric circular discs to represent first level of activities and subsequent level of activities (e.g., sub-activities) of the project and a focus (e.g., 305) of a first circular disc (e.g., 310) provides the insights (e.g., summary) of the project. For example, the focus 305 includes project name "project blossom- H-564-67", duration of the project "1 Feb. 2014-31 Mar. 2016." Further in the focus, the number of priority tasks associated with the project "project blossom- H-564-67" such as "4 alerts" 315 depicting existence of 4 critical activities and "3 important" 317 depicting existence of 3 important activities are displayed. In one embodiment, the number of priority tasks can be visualized using an option to scroll over the list of priority tasks. For example, either by horizontal scrolling 345 or by vertical scrolling 350.

At 240 of FIG. 2, a predefined number of nodes representing a first level of activities of the plurality of activities are displayed on the first circular disc. In one embodiment, the predefined number of nodes can be defined based on a display capacity of the GUI. The nodes are placed equidistant on the first circular disc. Each node on the circular discs representing an activity or element on the circular discs includes a capability to trigger sub-circular disc with sub nodes. Also, the nodes can represent, but not limited to Work Breakdown Structure (WBS) activities and project tasks, based on the nature of the project. In the example of FIG. 3, the predefined number of nodes is set to 12. Thereby 12 equidistant nodes, each node representing a first level of activity are displayed. For example, a node 321 represents a first level of activity "resource." Similarly, nodes 322 to 332 represent first level of activities "finance", "quality", "dealers", "logistics", "procurement", "design", "testing", "re-design", "development", "sales", "support", "bug fixes" and "correction close", respectively.

In one embodiment, an order in which the first level of activities is displayed can be customized. For example, the order can be based on the priority tasks. In the example, activities including alerts and activities which are important are displayed first upfront followed by ongoing activities. Also for instance, when a priority task (e.g., important) is selected through a user action such as, but not limited to tapping the priority task, the activities including important tasks are displayed first upfront. Further, different priority tasks can be graphically displayed differently using different colors, shades symbols or icons, and the like. For example, nodes representing activities, which includes alert messages are displayed in bold in FIG. 3 (e.g., node 321 to node 324), nodes representing activities, which includes important tasks are shaded (e.g., node 325 to node 327), and nodes representing ongoing activities include a subtle pulsating or breathing animation (e.g., 340). Further, on hover over nodes can show additional information in a popover, such as, but not limited to start and end dates, person responsible and other secondary information.

In one embodiment, when a number of first level of activities is greater than the predefined number of nodes on the first circular disc, graphical indicator 320 may be displayed to depict existence of one or more additional first level of activities other than the displayed first level of activities on the first circular disc. Further, an option is provided to display the additional first level of activities using the graphical indicator 320. For example, since the predefined number of nodes is 12, 12 nodes representing activities are presented in FIG. 3. However, when the number of first level of activities is greater than 12, the graphical indicator 320 is provided to indicate the existence of additional first level of activities in the project.

In one embodiment, the additional first level of activities can be visualized through a user action such as, but not limited to a scrolling or swiping the graphical indicator 320. For example, nodes corresponding to the additional first level of activities are revealed on the first circular disc 310 when the graphical indicator 320 is scrolled in clockwise motion and the previously displayed one or more of the first level of activities are hidden. Further, the additional first level of activities are hidden when the graphical indicator 320 is scrolled in anti-clockwise motion and the hidden one or more of the first level of activities are displayed.

Figure 4:
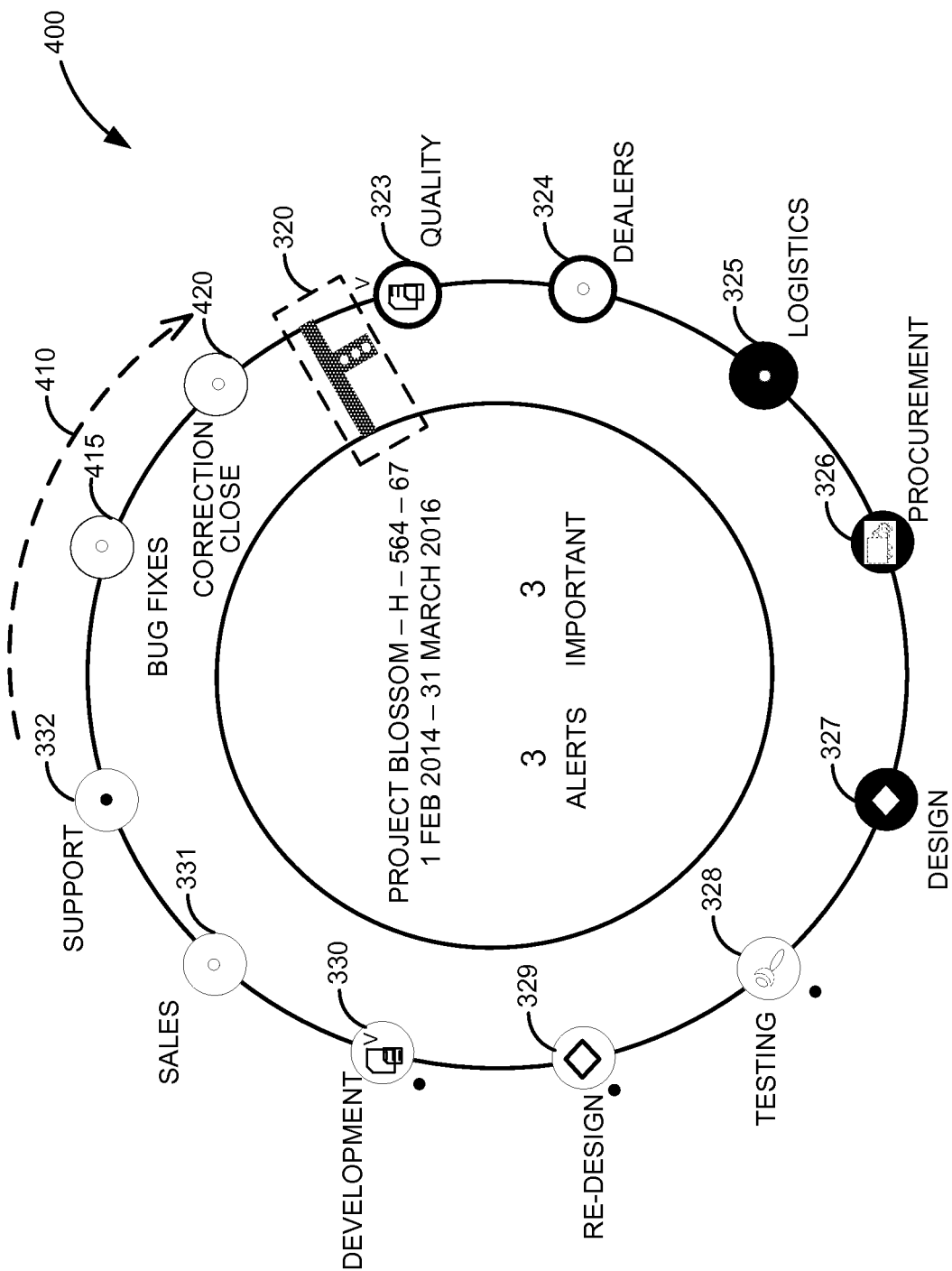
FIG. 4 is an exemplary project structure map illustrating functions of a graphical indicator, according to an embodiment.

FIG. 4 is exemplary project structure map 400 illustrating functions of the graphical indicator 320 of FIG. 3, according to an embodiment. When the graphical indicator 320 is scrolled in a clockwise direction (e.g., 410), the node 321 and the node 322 associated with the first level of activities "resource" and "finance" are hidden, and node 415 and node 420 representing additional first level of activities "bug fixes" and "correction close" are displayed. The display of number of nodes representing additional level of first level of activities depends on a distance the graphical indicator 320 is scrolled or swiped. The function of the graphical indicator 320 is described in greater detail in FIG. 7.

At 250 of FIG. 2, upon receiving a selection of a node on the first circular disc, a predefined number of nodes representing a second level of activities associated with a first level of activity corresponding to the selected node are displayed on a second circular disc concentric to the first circular disc. In the example illustrated in FIG. 3, when the node 327 associated with the first level of activity "design" is selected, the second level of activities associated with the first level of activity "design" is displayed. In one exemplary embodiment, the selection of the node can be through user action such as, but not limited to tapping the node and clicking the node.

Figure 5:
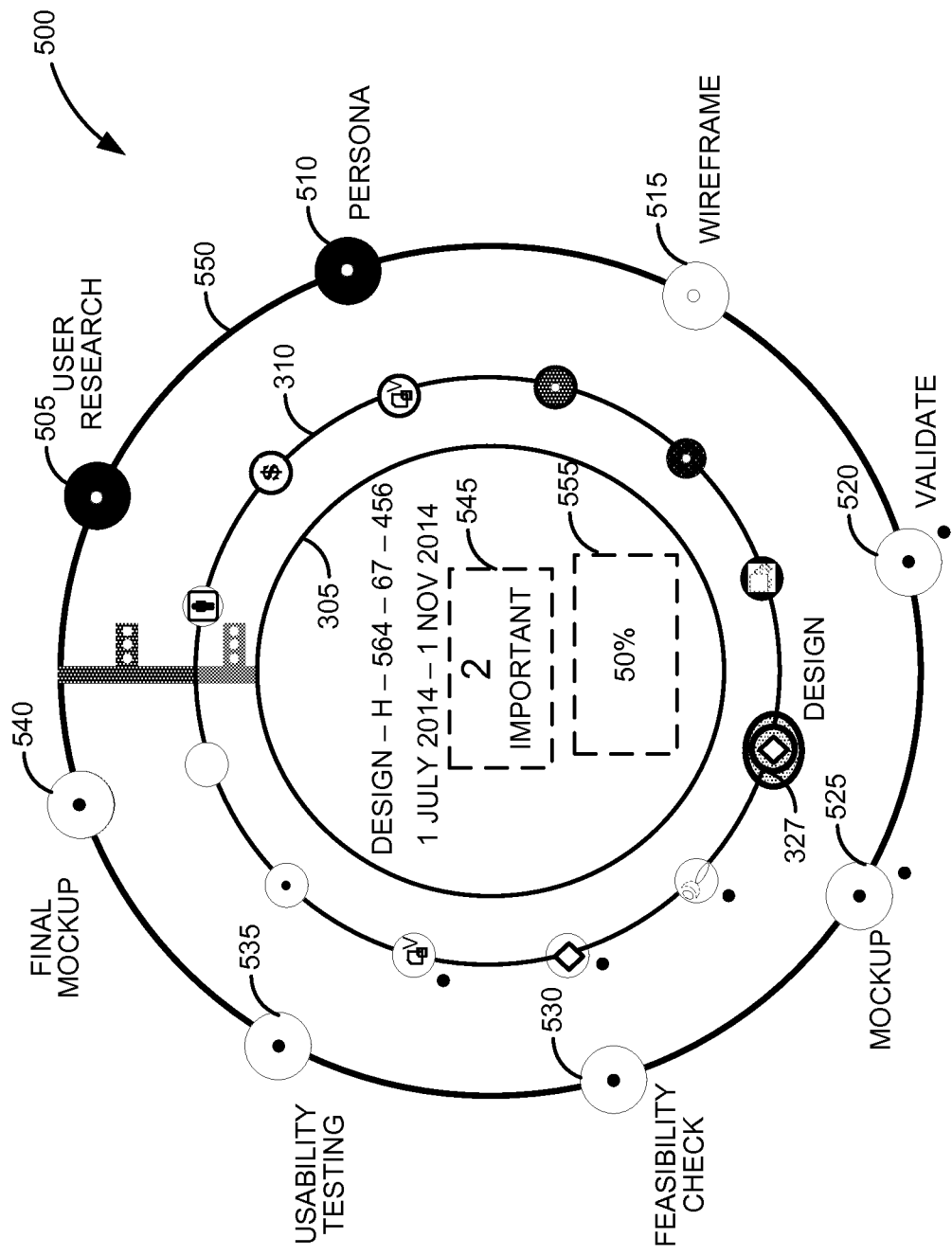
FIG. 5 shows a GUI illustrating an exemplary project structure map of the project "project blossom- H-564-67", according to an embodiment.

FIG. 5 shows a GUI illustrating exemplary project structure map 500 of the project "project blossom- H-564-67", according to an embodiment. When the node 327 associated with the first level of activity "design" is selected, the project structure map 500 is displayed. Second circular disc 550 concentric to the first circular disc 310 is presented. In one embodiment, the selected node 327 is distinctly indicated (e.g., graphically indicating using, but not limited to double circles) as shown in FIG. 5 to determine a path a user has drilled down to visualize the project structure. Further, a predefined number of equidistant nodes representing a second level of activities associated with the first level of activity "design" are displayed on the second circular disc 550. Similar to the predefined number of nodes corresponding to the first level of activities, the predefined number of nodes corresponding to the second level of activities can be defined based on the display capacity of the GUI. In the example, the predefined number of nodes corresponding to the second level of activities is defined as 8. Thereby 8 nodes are displayed, each node representing a second level of activity corresponding to the first level of activity "design". For example, a node 505 represents a second level of activity "user research." Similarly, nodes 510 to 540 represent second level of activities "persona", "wireframe", "validate", "mockup", "feasibility check", "usability testing" and "final mockup", respectively.

Similarly, subsequent level of activities associated with an activity is displayed. For example, when the node 535 associated with the second level of activity "usability testing" is selected, then third level of activities associated with the second level of activity "usability testing" is displayed.

Figure 6:
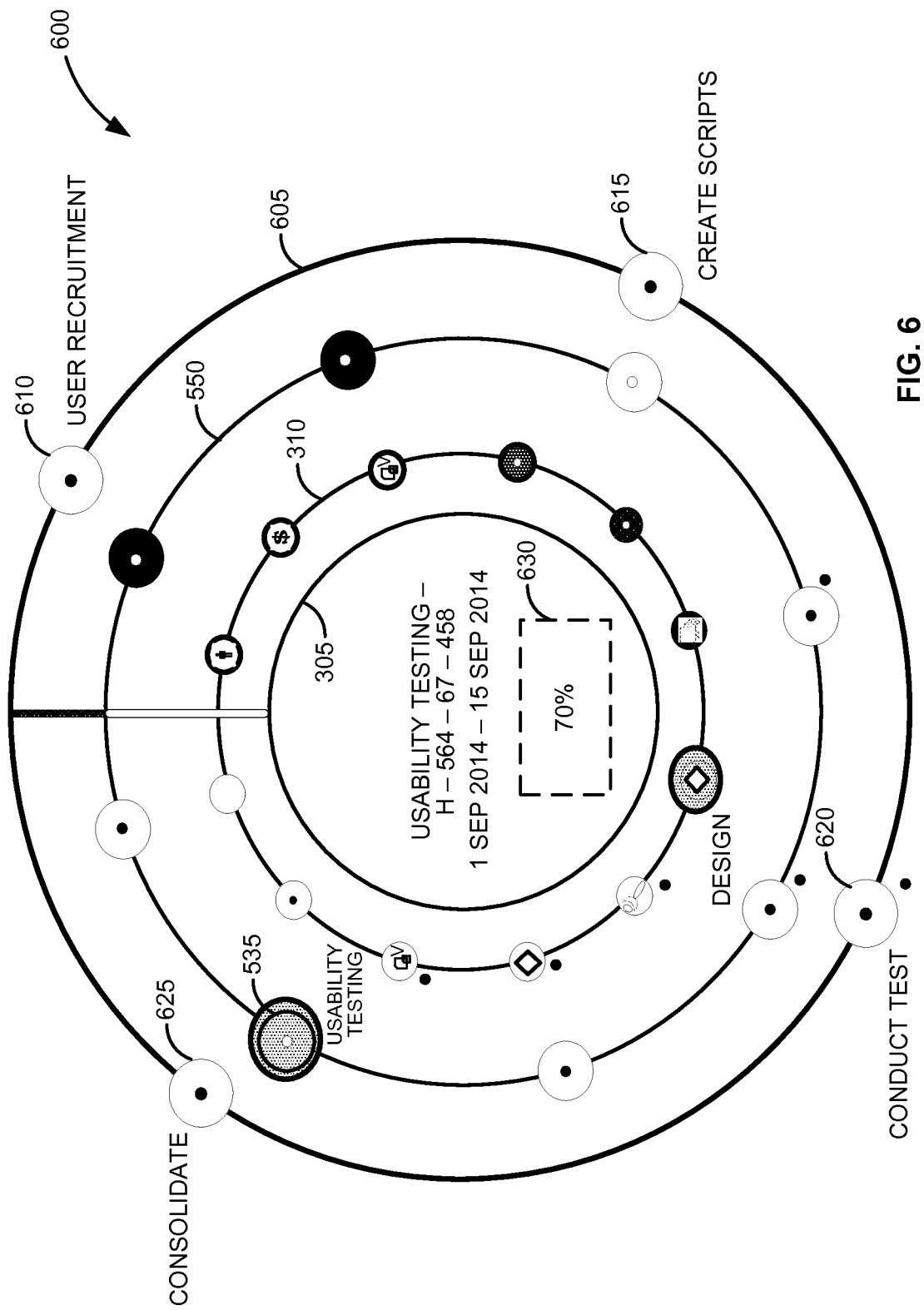
FIG. 6 shows a GUI illustrating an exemplary project structure map of the project "project blossom- H-564-67", according to an embodiment.

FIG. 6 shows a GUI illustrating exemplary project structure map 600 of the project "project blossom- H-564-67", according to an embodiment. When the node 535 associated with the second level of activity "usability testing" is selected, the project structure map 600 is displayed. Third circular disc 605 concentric to the second circular disc 550 is provided. Further, a predefined number of nodes representing a third level of activities associated with the second level of activity "usability testing" are displayed on the third circular disc 605. Similar to the predefined number of nodes corresponding to the second level of activities, the predefined number of nodes corresponding to the third level of activities can be defined based on the display capacity of the GUI.

In the example, the predefined number of nodes corresponding to the third level of activities is set as 4. Thereby 4 nodes are displayed, each node representing a third level of activity corresponding to the second level of activity "usability testing". For example, a node 610 represents a third level of activity "user recruitment." Similarly, nodes 615 to 625 represent third level of activities "create scripts", "conduct test" and "consolidate", respectively. Further, absence of the graphical indicator in the third circular disc 605 indicates that there is no more additional third level of activities.

In one exemplary embodiment, the number of nodes in each circular disc (e.g., the first circular disc 310, the second circular disc 550 and the third circular disc 605) can be predefined to one value or the number of nodes in each circular disc is predefined to different values. Further, each circular disc (e.g., the first circular disc 310, the second circular disc 550 and the third circular disc 605) is represented using different colors. Also, the circular discs (e.g., the first circular disc 310, the second circular disc 550 and the third circular disc 605) representing the levels in a hierarchy of the project structure can follow a spiral course, enabling it to hold more nodes than visible. Further, each node on the circular discs (e.g., the first circular disc 310, the second circular disc 550 and the third circular disc 605) can display graphical indicators such as, but not limited to icon or color to indicate priority tasks such as, but are not limited to alerts and important activities.

At 260 of FIG. 2, one or more insights of a first level of activity corresponding to the selected node in the focus of the first circular disc are displayed. For example in FIG. 5, the focus 305 of the first circular disc 310 includes insights of the selected node 327 associated with the first activity "design." The focus includes activity label "design- H-564-67-456", duration of the activity "1 Jul. 2014-1 Nov. 2014." Further in the focus, the number of priority tasks associated with the first level of activity "design" such as "2 important" 545 stating important activities are presented. In one exemplary embodiment, status of the activity "design" corresponding to the selected node 327 can be displayed. For example, the focus depicts the status of the activity "design" by a completion percentage (e.g., 555). Also, the status can be graphically depicted by using, but not limited to, different colors and shading the node corresponding to the activity "design." In FIG. 6, the focus 305 of the first circular disc 310 includes insights of the selected node 535 associated with the second activity "usability testing." The focus includes activity label "usability testing- H-564-67-458", duration of the activity "1 Sep. 2014-15 Sep. 2014." Thereby, the focus is on a circular disc, which includes an activity associated with the selected node, and other circular discs are subdued. In one exemplary embodiment, status of the activity "usability testing" corresponding to the selected node 535 can be displayed. For example, the focus depicts the status of the activity "usability testing" by a completion percentage (e.g., 630). Also, the status can be graphically depicted by using, but not limited to different colors and shading of the node corresponding to the activity "usability testing."

Therefore, with the described method of displaying the project structure map, real time data of the project structure can be visualized. The nodes representing activities at each level of the project can be explored and the activities with alert or ones that are important or data relevant at that point in time at any level, can be focused. Thereby, relevant information of the project is surfaced up to a project manager to ensure important information is not missed or is not acted upon. A project structure map can be customized based on the information which has to be surfaced (e.g., alerts, important, ongoing and the like). This helps to ensure that the project is on track, take proactive measures and avoid financial losses or project delay that could be caused due to lack of real time information. Further, the method can be extended to other hierarchy structures. For example, organizational people hierarchy and so on.

Figure 7:
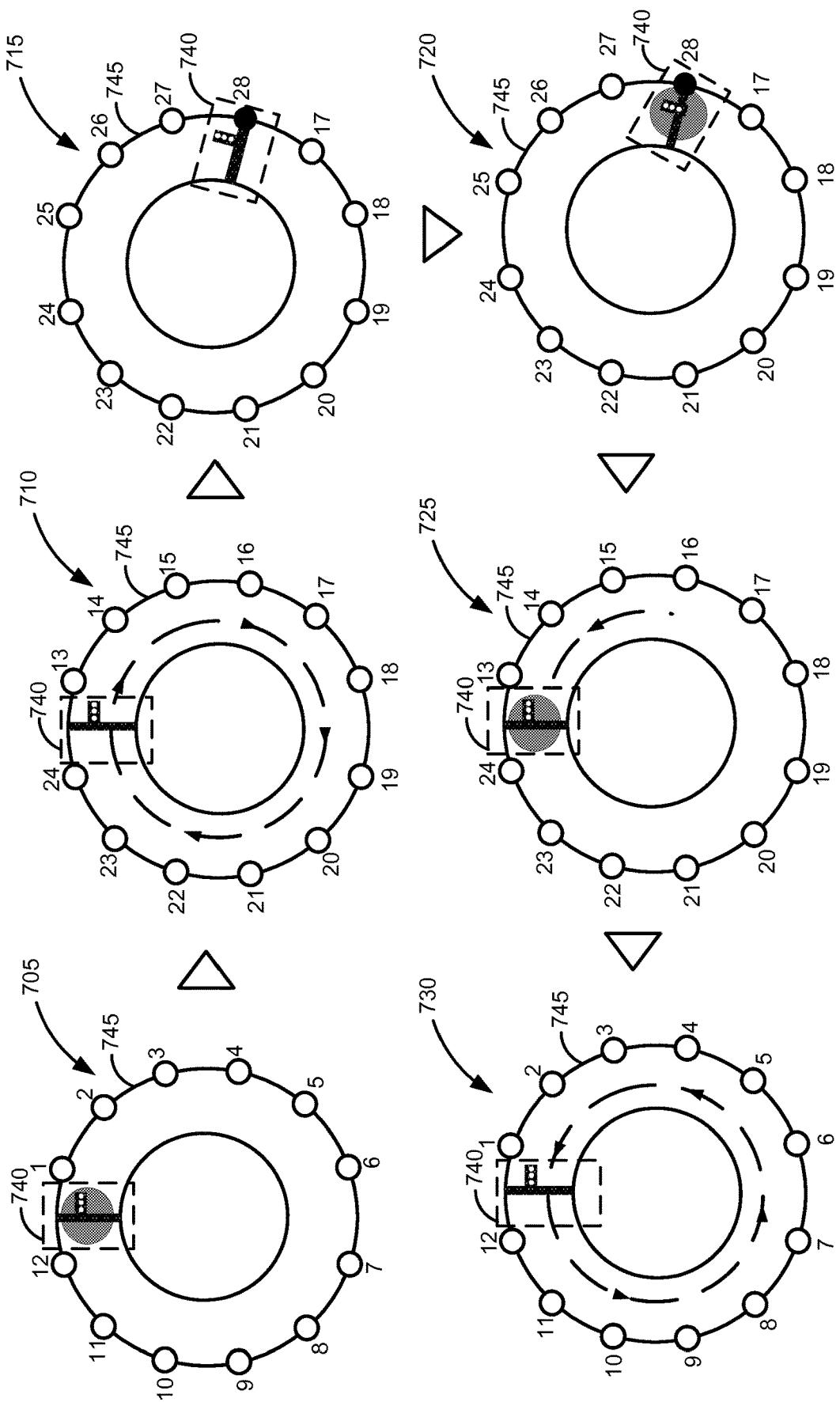
FIG. 7 shows exemplary project structure maps illustrating a method of visualization of first level of activities of a project, according to an embodiment.

FIG. 7 shows exemplary project structure maps (e.g., 705 to 730) illustrating a method of visualization of first level of activities of a project, according to an embodiment. The project structure maps (e.g., 705 to 730) include a plurality of concentric circular discs and the concentric discs include predefined number of nodes representing activities. For example, the predefined number of nodes of a first circular disc 745 is 12. Thereby the project structure map 705 includes 12 nodes, each node representing a first level activity, is shown upfront. Consider an example that the project includes 28 first level of activities. Since the number of first level of activities is greater than 12, graphical indicator 740 is presented indicating a direction in which other activities can be presented. Using the graphical indicator 740, other first level of activities can be visualized in sets of 12.

In one exemplary embodiment, the graphical indicator 740 of the project structure map 705 is scrolled in a clockwise direction to display next 12 first level of activities of the project, i.e., 13 to 24 nodes as shown in the project structure map 710 and the 1 to 12 nodes are hidden. Further, the graphical indicator 740 of the project structure map 710 indicates existence of other activities apart from 24 activities. Thereby, the graphical indicator 740 of the project structure map 710 is scrolled or swiped in a clockwise direction to present next 4 first level of activities of the project, i.e., 25 to 28 nodes as shown in the project structure map 715 and 13-16 nodes are hidden. In the project structure map 715, the graphical indicator 740 indicates that all the first level activities are revealed there is no more first level of activities. Further, previously displayed first level of activities can be can be visualized by scrolling the graphical indicator 740 in anti-clock direction, acts like UNDO action In the project structure map 720, the graphical indicator 740 is scrolled in the anti-clock direction to visualize 12 nodes depicting 13-24 first level of activities, as displayed in the project structure map 725. Further, the graphical indicator 740 of the project structure map 725 provides an option to visualize 17-28 first level of activities or 1-12 first level of activities based on the direction in which the graphical indicator is scrolled. Since the graphical indicator 740 of the project structure map 725 is scrolled in anti-clock wise direction, 12 nodes representing 1-12 first level of activities are displayed as shown in the project structure map 730.

In one exemplary embodiment, the graphical indicator 740 of the project structure map 705 is tapped to visualize next first level of activities of the project, i.e., 13 to 24 nodes as shown in the project structure map 710 and the 1 to 12 nodes are hidden. Also, the graphical indicator 740 of the project structure map 725 is tapped to visualize first 12 nodes depicting 1-12 first level of activities, as displayed in the project structure map 740.

Figure 8:
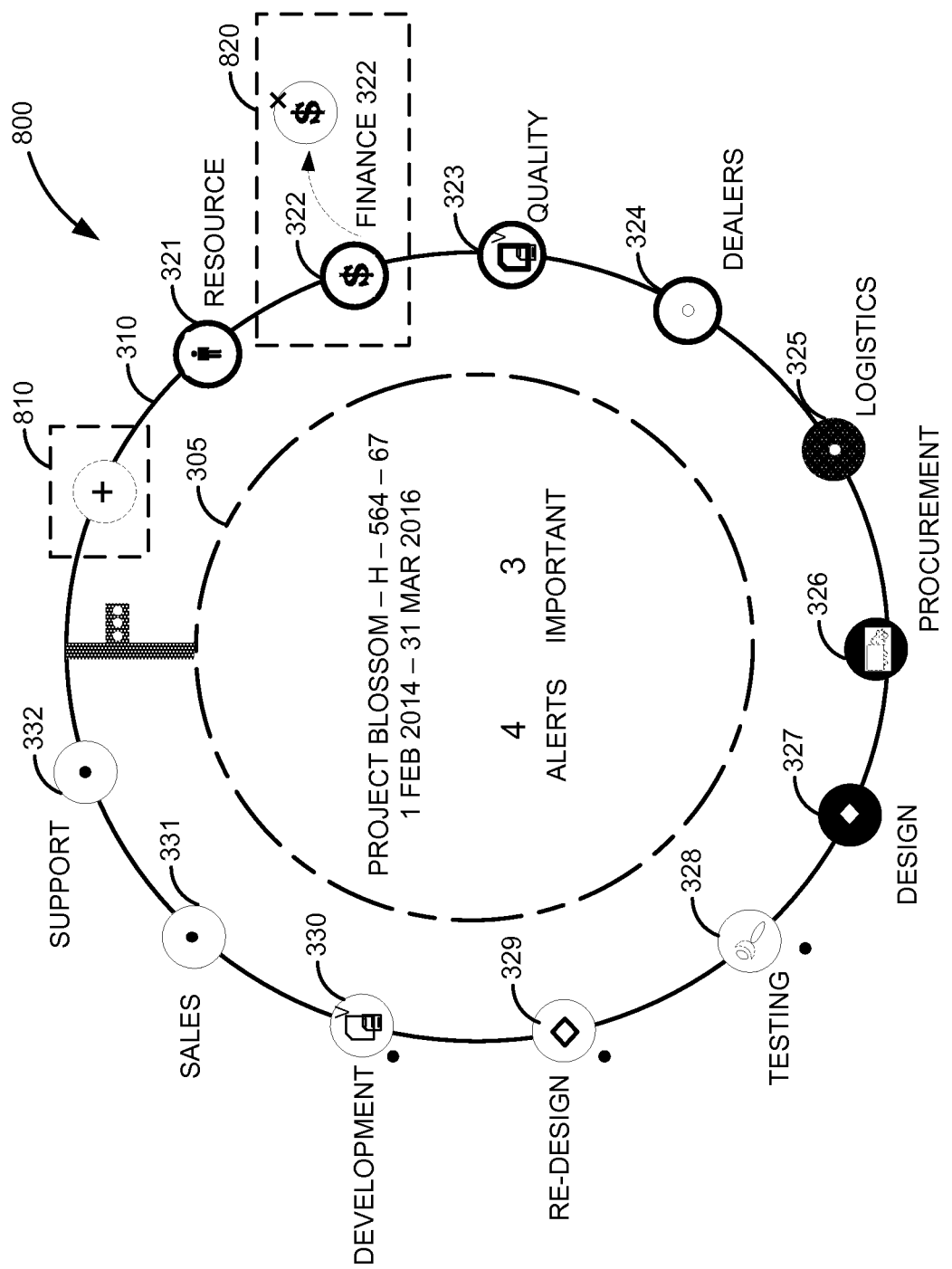
FIG. 8 is an exemplary project structure map illustrating a method of modifying a displayed number of nodes, according to an embodiment.

FIG. 8 is exemplary project structure map 800 illustrating a method of modifying a displayed number of nodes, according to an embodiment. An option is provided to graphically modify the number of nodes on each circular disc. For example, the predefined number of nodes on the first circular disc (e.g., 310 of FIG. 3), the predefined number of nodes on the second circular disc (e.g., 550 of FIG. 5) and the predefined number of nodes on the third circular disc (e.g., 605 of FIG. 6) can be modified. In one exemplary embodiment, each circular disc (e.g., a first circular disc 310) includes a symbol '+' to add new node (e.g., 810). Further, a node on the first circular disc 310 can be deleted. For example, a node to be deleted can be dragged outside the circular disc to delete (e.g., 820). The node may have across icon on top to indicate its being deleted. Furthermore, a node on the circular disc can be tapped to edit relevant text field corresponding to the node. In one embodiment, at least one of a node (e.g., activity with or without corresponding sub-activities) and a circular disc associated with another project can be copied to the project structure map 800 (e.g., by a user action of dragging and dropping). Further, content of a focus 305 can be modified.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, all of the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. One or more of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to provide a project structure map, the method comprising:
   receiving a description of a project, the description defining a plurality of activities of the project;
   determining one or more insights of the project including a time span of the project based on the received description;
   displaying the determined one or more insights of the project including a time span of the project in a centermost portion of a first circular disc on a computer generated graphical user interface;
   displaying a predefined number of activity nodes representing a first level of activities of the plurality of activities on a boundary of the first circular disc;
   receiving a selection of a first selected activity node on the first circular disc;
   automatically displaying, in response to the selection of the first selected activity node, a second circular disc that is concentric to the first circular disc;
   automatically displaying, in response to the selection of the first selected activity node, and on a boundary of the second circular disc, a predefined number of activity nodes representing a second level of activities associated with a first level of activity corresponding to the first selected activity node;
   automatically adjusting, in response to the selection of the first selected activity node, the first selected activity node on the boundary of the first circular disc with a first graphical indication that visually indicates a drill-down path of a project structure that includes the selection of the first selected activity node;
   automatically displaying, in response to the selection of the first selected activity node, one or more insights of the first level of activity corresponding to the selected activity node in the centermost portion of the first circular disc, wherein the one or more insights of the first level of activity corresponding to the selected node provides finer details of the activity including at least one of a duration of the activity and a status of the activity by completion percentage;
   receiving a selection of a second selected activity node on the second circular disc;
   automatically displaying, in response to the selection of the second selected activity node, a third circular disc that is concentric to the first circular disc and the second circular disc;
   automatically displaying, in response to the selection of the second selected activity node, and on a boundary of the third circular disc, a predefined number of activity nodes representing a third level of activities associated with a second level of activity corresponding to the second selected activity node; and
   automatically adjusting, in response to the selection of the second selected activity node, the second selected activity node on the boundary of the second circular disc with a second graphical indication, that, combined with the first graphical indication, visually indicates, on the same computer-generated graphical interface, an updated drill-down path of the project structure that includes the selection of the second selected activity node along with the selection of the first selected activity node.

2. The computer implemented method of claim 1, wherein the description defining the plurality of activities comprises at least one of ID numbers of the plurality of activities, a list of first level of activities, a list of subsequent level of activities associated with the first level of activities, task duration of the plurality of activities, status of the plurality of activities, and a predecessor activity and a successor activity associated with the plurality of activities.

3. The computer implemented method of claim 1, wherein the one or more insights of the project comprises a predefined list of priority tasks associated with the plurality of activities.

4. The computer implemented method of claim 1, wherein the first level of activities is displayed on the first circular disc in an order based on the one or more insights of the project.

5. The computer implemented method of claim 1 further comprising:
   when a number of first level of activities is greater than the predefined number of nodes on the first circular disc, displaying a graphical indicator to depict existence of one or more additional first level of activities other than the displayed first level of activities on the first circular disc; and
   providing an option to display the one or more additional first level of activities using the graphical indicator.

6. The computer implemented method of claim 1 further comprising:
   providing an option to graphically modify the predefined number of nodes on the first circular disc and the predefined number of nodes on the second circular disc.

7. The computer implemented method of claim 1 further comprising:
   copying at least one of a node and a circular disc associated with another project.

8. A computer system to provide a project structure map, the computer system comprising:
   at least one processor; and
   one or more memory devices communicative with the at least one processor, wherein the one or more memory devices store instructions to:
   receive a description of a project, the description defining a plurality of activities of the project;
   determine one or more insights of the project including a time span of the project based on the received description;
   display the determined one or more insights of the project including a time span of the project in a centermost portion of a first circular disc on a computer generated graphical user interface;
   display a predefined number of activity nodes representing a first level of activities of the plurality of activities on a boundary of the first circular disc;
   receive a selection of a first selected activity node on the first circular disc;
   automatically display, in response to the selection of the first selected activity node, a second circular disc that is concentric to the first circular disc;
   automatically display, in response to the selection of the first selected activity node, and on a boundary of the second circular disc, a predefined number of activity nodes representing a second level of activities associated with a first level of activity corresponding to the first selected activity node;

automatically adjust, in response to the selection of the first selected activity node, the first selected activity node on the boundary of the first circular disc with a first graphical indication that visually indicates a drill-down path of a project structure that includes the selection of the first selected activity node;

automatically display, in response to the selection of the first selected activity node, one or more insights of the first level of activity corresponding to the selected activity node in the centermost portion of the first circular disc, wherein the one or more insights of the first level of activity corresponding to the selected node provides finer details of the activity including at least one of a duration of the activity and a status of the activity by completion percentage;

receive a selection of a second selected activity node on the second circular disc;

automatically display, in response to the selection of the second selected activity node, a third circular disc that is concentric to the first circular disc and the second circular disc;

automatically display, in response to the selection of the second selected activity node, and on a boundary of the third circular disc, a predefined number of activity nodes representing a third level of activities associated with a second level of activity corresponding to the second selected activity node; and automatically adjust, in response to the selection of the second selected activity node, the second selected activity node on the boundary of the second circular disc with a second graphical indication, that, combined with the first graphical indication, visually indicates, on the same computer generated graphical interface, an updated drill-down path of the project structure that includes the selection of the second selected activity node along with the selection of the first selected activity node.

9. The computer system of claim 8, wherein the description defining the plurality of activities comprises at least one of ID numbers of the plurality of activities, a list of first level of activities, a list of subsequent level of activities associated with the first level of activities, task duration of the plurality of activities, status of the plurality of activities, and a predecessor activity and a successor activity associated with the plurality of activities.

10. The computer system of claim 8, wherein the one or more insights of the project comprises a predefined list of priority tasks associated with the plurality of activities.

11. The computer system of claim 8, wherein the first level of activities is displayed on the first circular disc in an order based on the one or more insights of the project.

12. The computer system of claim 8 further comprising:
when a number of first level of activities is greater than the predefined number of nodes on the first circular disc, display a graphical indicator to depict existence of one or more additional first level of activities other than the displayed first level of activities on the first circular disc; and provide an option to display the one or more additional first level of activities using the graphical indicator.

13. The computer system of claim 8 further comprising:
provide an option to graphically modify the predefined number of nodes on the first circular disc and the predefined number of nodes on the second circular disc.

14. A computer program product encoded on a non-transitory storage medium, the product comprising non-transitory, computer readable instructions for causing one or more processors to perform operations comprising:

receiving a description of a project, the description defining a plurality of activities of the project;

determining one or more insights of the project including a time span of the project based on the received description;

displaying the determined one or more insights of the project including a time span of the project in a centermost portion of a first circular disc on a computer generated graphical user interface;

displaying a predefined number of activity nodes representing a first level of activities of the plurality of activities on a boundary of the first circular disc;

receiving a selection of a first selected activity node on the first circular disc;

automatically displaying, in response to the selection of the first selected activity node, a second circular disc that is concentric to the first circular disc;

automatically displaying, in response to the selection of the first selected activity node, and on a boundary of the second circular disc, a predefined number of activity nodes representing a second level of activities associated with a first level of activity corresponding to the first selected activity node;

automatically adjusting, in response to the selection of the first selected activity node the first selected activity node on the boundary of the first circular disc with a first graphical indication that visually indicates a drill-down path of a project structure that includes the selection of the first selected activity node;

automatically displaying, in response to the selection of the first selected activity node, one or more insights of the first level of activity corresponding to the selected activity node in the centermost portion of the first circular disc, wherein the one or more insights of the first level of activity corresponding to the selected node provides finer details of the activity including at least one of a duration of the activity and a status of the activity by completion percentage;

receiving a selection of a second selected activity node on the second circular disc;

automatically displaying, in response to the selection of the second selected activity node, a third circular disc that is concentric to the first circular disc and the second circular disc;

automatically displaying, in response to the selection of the second selected activity node, and on a boundary of the third circular disc, a predefined number of activity nodes representing a third level of activities associated with a second level of activity corresponding to the second selected activity node; and automatically adjusting, in response to the selection of the second selected activity node, the second selected activity node on the boundary of the second circular disc with a second graphical indication, that, combined with the first graphical indication, visually indicates, on the same computer-generated graphical interface, an updated drill-down path of the project structure that includes the selection of the second selected activity node along with the selection of the first selected activity node.

15. The computer program product of claim FM 26, wherein the one or more insights of the project comprises a predefined list of priority tasks associated with the plurality of activities.

16. The computer program product of claim 14, wherein the first level of activities is displayed on the first circular disc in an order based on the one or more insights of the project.

17. The computer program product of claim 14, wherein the computer generated graphical user interface includes:
- a graphical indicator to depict existence of one or more additional first level of activities other than the displayed first level of activities on the first circular disc; and
- an option within the graphical indicator to display the one or more additional first level of activities.

18. The computer program product of claim 14, wherein the computer generated graphical user interface includes an option to graphically modify the predefined number of nodes on the first circular disc and the predefined number of nodes on the second circular disc.

* * * * *